US012585364B2

(12) United States Patent
Roehrig

(10) Patent No.: US 12,585,364 B2
(45) Date of Patent: Mar. 24, 2026

(54) INPUT DEVICE WITH PROGRAMMABLE STRIPS FOR PERFORMING OPERATIONS ON A DISPLAY OF AN ELECTRONIC DEVICE

(71) Applicant: Joshua Anthony Roehrig, Greenock, PA (US)

(72) Inventor: Joshua Anthony Roehrig, Greenock, PA (US)

(*) Notice: Subject to any disclaimer, the term of this patent is extended or adjusted under 35 U.S.C. 154(b) by 0 days.

(21) Appl. No.: 18/923,587

(22) Filed: Oct. 22, 2024

(65) Prior Publication Data

US 2025/0044902 A1 Feb. 6, 2025

Related U.S. Application Data

(63) Continuation-in-part of application No. 18/351,941, filed on Jul. 13, 2023.

(51) Int. Cl.
*G06F 3/044* (2006.01)
*G06F 3/0354* (2013.01)

(52) U.S. Cl.
CPC .......... *G06F 3/044* (2013.01); *G06F 3/03543* (2013.01)

(58) Field of Classification Search
CPC .............................. G06F 3/03543; G06F 3/044
See application file for complete search history.

(56) References Cited

U.S. PATENT DOCUMENTS

| | | |
|---|---|---|
| 6,879,930 B2 | 4/2005 | Sinclair |
| 11,132,059 B2 | 9/2021 | Bonanno et al. |

| | | | | |
|---|---|---|---|---|
| 2002/0067334 A1* | 6/2002 | Hinckley | .............. | G06F 3/0219 |
| | | | | 345/156 |
| 2006/0125791 A1* | 6/2006 | Lian | .................... | G06F 3/03543 |
| | | | | 345/163 |
| 2006/0274041 A1* | 12/2006 | Han | .................... | G06F 3/03543 |
| | | | | 345/163 |
| 2008/0277171 A1* | 11/2008 | Wright | ................ | G06F 3/03548 |
| | | | | 178/18.06 |
| 2010/0245249 A1* | 9/2010 | Ng | ....................... | G06F 3/03543 |
| | | | | 345/166 |
| 2011/0260971 A1* | 10/2011 | Lin | ........................ | G06F 3/0362 |
| | | | | 345/163 |

(Continued)

OTHER PUBLICATIONS www.vmeter.net.

*Primary Examiner* — Hong Zhou

(57) ABSTRACT

The present invention provides a input device for performing operations on a display of an electronic device, the input device incorporating a body having an internal cavity; plus a first capacitive touch slider disposed in a surface of the housing, the first capacitive touch slider to produce a first signal in response to sliding of a finger in either of two directions; plus a second capacitive touch slider disposed parallel to the first capacitive touch slider in a surface of the housing, the second capacitive touch slider configured to produce a second signal in response to sliding a finger in either of two directions, all communicating with an interface disposed within the internal cavity, wherein the communication interface is operably coupled to the first and second capacitive touch sliders and the programmable depressible button is configured to electronically interface with the display of an electronic device.

1 Claim, 10 Drawing Sheets

(56)                    References Cited

U.S. PATENT DOCUMENTS

2011/0267271  A1*  11/2011  Atzmon  ................... G06F 3/038
                                                                   345/163
2012/0026092  A1*   2/2012  Tsao  .................... G06F 3/03543
                                                                   345/163
2013/0120262  A1*   5/2013  Piot  .................... G06F 3/03547
                                                                   345/163
2013/0169424  A1    7/2013  Kujawski et al.
2020/0272252  A1*   8/2020  Flach  ................... H01H 13/807
2022/0283671  A1*   9/2022  Sim  ......................... G06F 3/044

* cited by examiner

INPUT DEVICE WITH PROGRAMMABLE STRIPS FOR PERFORMING OPERATIONS ON A DISPLAY OF AN ELECTRONIC DEVICE

CONTINUATION IN PART TO RELATED APPLICATION

This application is a continuation-in-part of U.S. Utility patent application Ser. No. 18/331,941 filed Jun. 9, 2023, incorporated herein by reference in its entirety.

FIELD OF THE INVENTION

The present invention relates, in general, to input devices for performing operations on an electronic display, and more particularly for variations of a mouse to facilitate extensive daily use.

BACKGROUND OF THE INVENTION

Prior to the conception and development of the present invention, the marketplace and patent literature are replete with an abundance of devices and systems for scrolling, zooming, and moving cursors on an electronic display. Existing input devices (computer mice) are deficient with regard to several aspects. For instance, current input devices use a rotary encoder for scrolling or zooming and the usage of the rotary encoder induces fatigue on the fingers of a user. The frequent need to flick the finger and press hard on the rotary encoder of the computer mouse can cause finger and hand problems such as fatigue in the hand, pain in the hand and finger joints, cramps in the hand, etc. Further, it is exhausting needing to fight the feeling of fatigue and pain in the hand and the finger joints. For instance, current input devices require that the user lift his fingers for performing scrolling and/or zooming using the current input devices.

Therefore, there is a need for an input device with programmable strips for performing operations on a display of an electronic device that may overcome one or more of the above-mentioned problems and/or limitations.

PRIOR ART

In U.S. Pat. No. 11,132,059 Bonanno et al disclose a computer mouse with force-sensitive and haptic elements generating input signals. Sinclair et al in U.S. Pat. No. 6,879,930 discloses a capacitive touch slider. Kujawski in US Patent Application 2013/0169424 discloses a touch sensor strip being used for both vertical and horizontal scrolling. Apparently, nothing in the prior art teaches user-programmable features for a computer mouse.

SUMMARY OF THE INVENTION

The present invention provides a user-friendly input device for performing operations on a display of an electronic device, the input device incorporating a body having an internal cavity, and a first capacitive touch slider disposed in a surface of the housing, the first capacitive touch slider configured to produce a signal in response to sliding in either of two directions; and, a second capacitive touch slider disposed parallel to the first input structure in a surface of the housing, the second capacitive touch slider configured to produce a signal in response to sliding in either of two directions. In addition, there is a programmable button disposed in the surface of the housing between the first and second capacitive touch slider and configured to produce a signal when depressed; and, a communication interface disposed within the internal cavity, wherein the communication interface is operably coupled to the first and second capacitive touch slider and the programmable depressible button, and is configured to electronically interface with the display of an electronic device.

DETAILED DESCRIPTION OF A PRESENTLY PREFERRED AND VARIOUS ALTERNATIVE EMBODIMENTS OF THE INVENTION

Overview: The present disclosure describes an input device with programmable capacitive touch slider strips for performing operations on a display of an electronic device. The input device may include a computer mouse (mouse), a keyboard, any electronic device, etc. Further, the electronic device with the display may include a computer (computing device). The programmable capacitive touch sliders are designed to be used for performing scrolling and/or zooming on the computer. Further, in an embodiment, the programmable strips may be implemented using a capacitive technology. Further, the programmable capacitive touch slider may be a capacitive touch slider with two triangular conductors, or an array of capacitive sensors. In alternative embodiment, the programmable slider may be implemented using non-capacitive technology such as an array of photoresistors, a potentiometer slider, a linear soft potentiometer, as well as similar electronic configurations.

Figure 1:
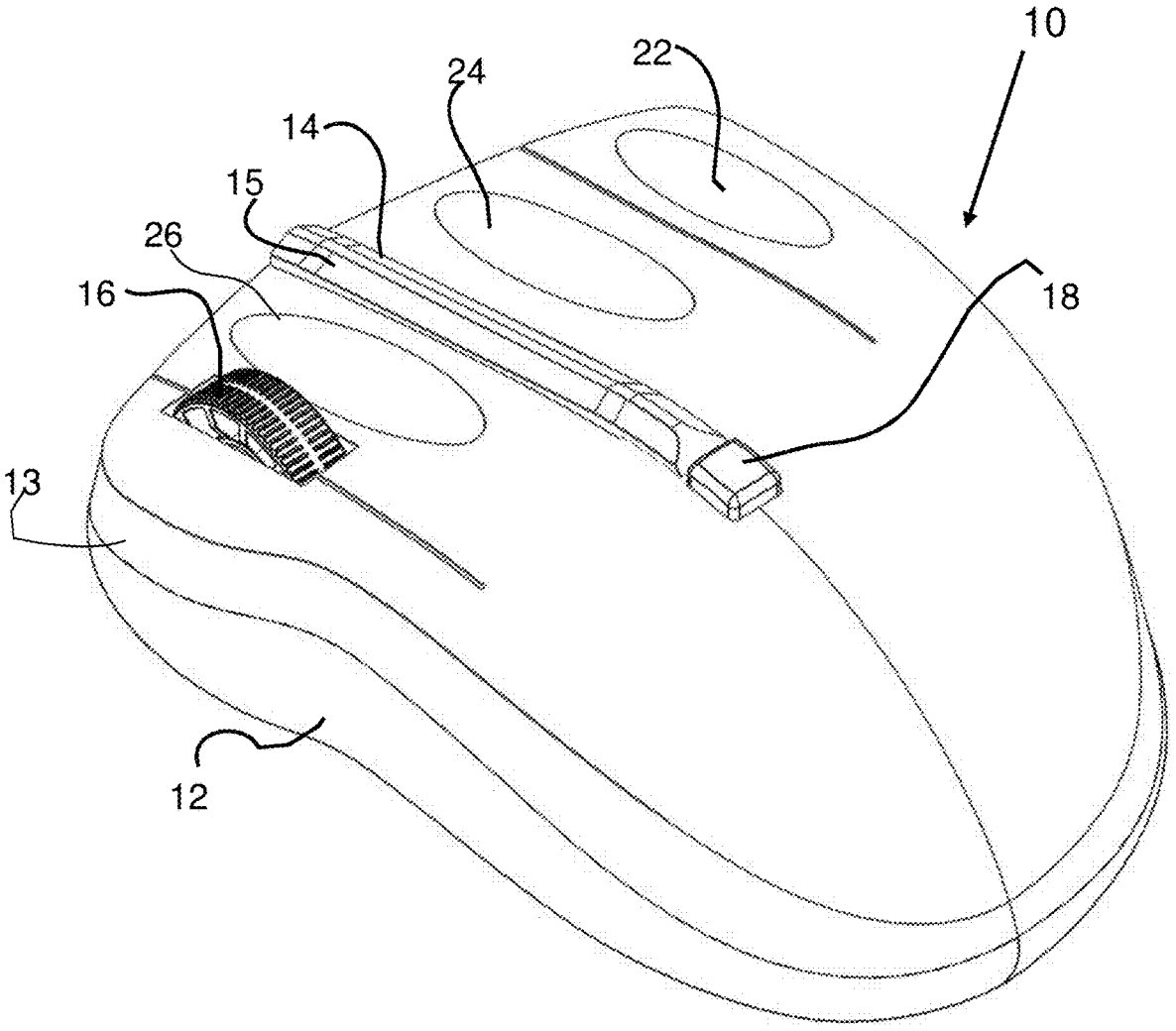
FIG. 1 provides a perspective view of a preferred embodiment of the present invention.

Referring initially to FIG. 1, a preferred embodiment of the present invention, shown generally as 10, is illustrated in this perspective view. There is a body having a bottom shell 12 and a top shell 13. Within the top shell 13 are a right mouse button cantilever 22, a middle mouse button cantilever 24, and a left mouse button cantilever 26. The mouse button cantilevers, when pressed, activates the internal electronic components to perform common actions, such as selecting what the cursor is on. But they can also be programmed in the driver software for other actions. An optional mouse wheel 16 is included here as some users may prefer a familiar feature at times. A center button shaft 18 is available for certain functions. 14 and 15 are capacitive touch slider covers, which cover the capacitive sliders described later.

Figure 2:
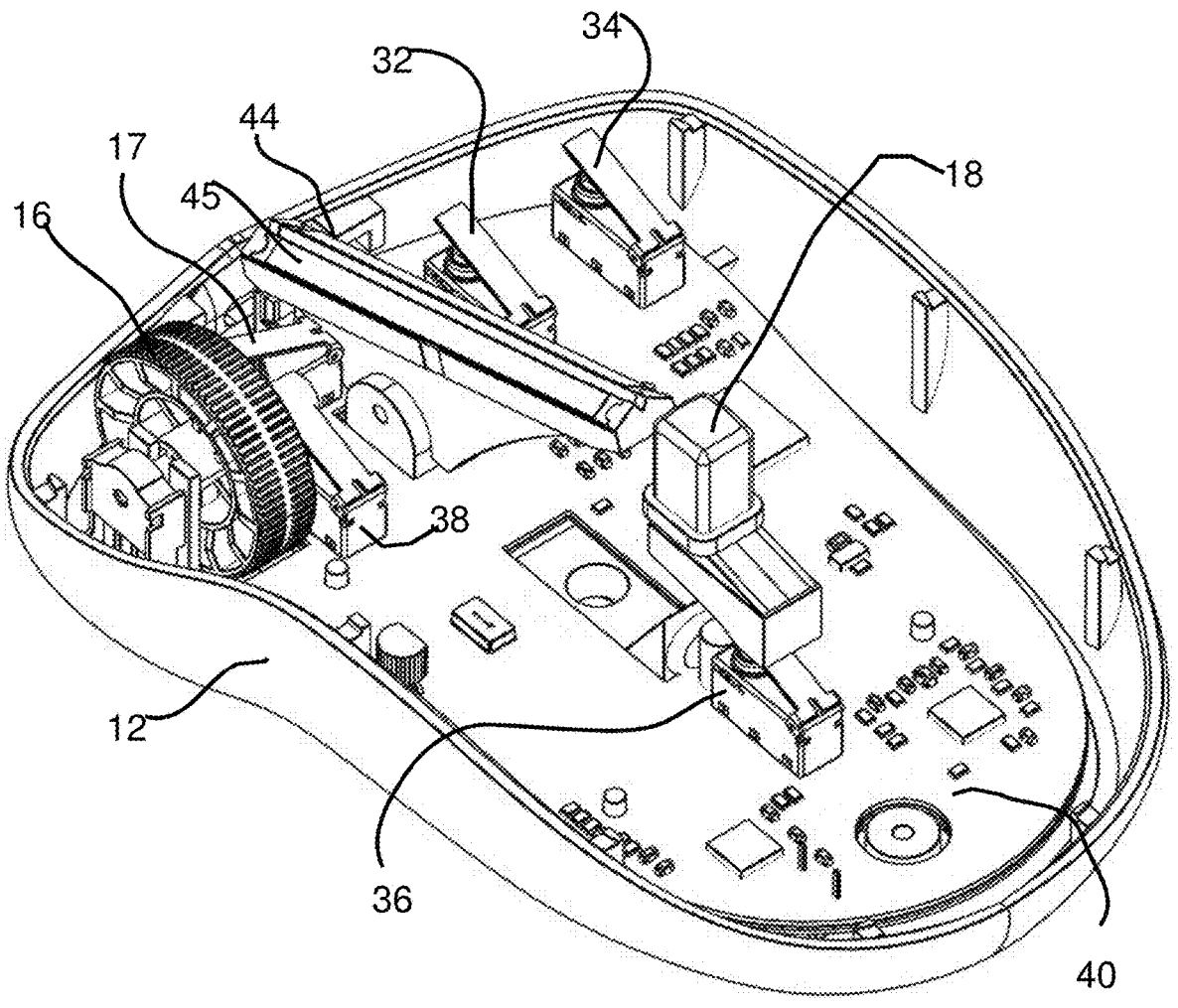
FIG. 2 is a perspective internal view of the preferred embodiment of the present invention.

FIG. 2 is a perspective internal view of the preferred embodiment of the present invention showing most of the parts inside the bottom shell 12. These were not visible in FIG. 1, but integrated with portions of the top shell 13 now removed. For instance, button 18 can be pressed to activate switch 36 on the motherboard 40. Also shown are the right electrical button 34, the middle electrical button 36 and the left electrical button 17. 44 is the right capacitive touch slider and 45 is the left capacitive touch slider. Both capacitive touch sliders 44 and 45 are preferably comprised of a combination of a flex printed circuit board (PCB) and a rigid PCB. These sliders can be programmed for different functionality or modes. For instance, the right slider could be for just scrolling down while the left slider is for just upward scrolling. Furthermore, the speed of scrolling can be varied depending on where along the slider the finger is touching the capacitive slider. The user can achieve a wide range of functionality without having to lift a finger from the mouse and without the need to have the mouse on a surface. These are key objects of the present invention making it novel and ergonomic. While the preferred two parallel touch sliders are shown, one would still be acceptable.

Figure 3:
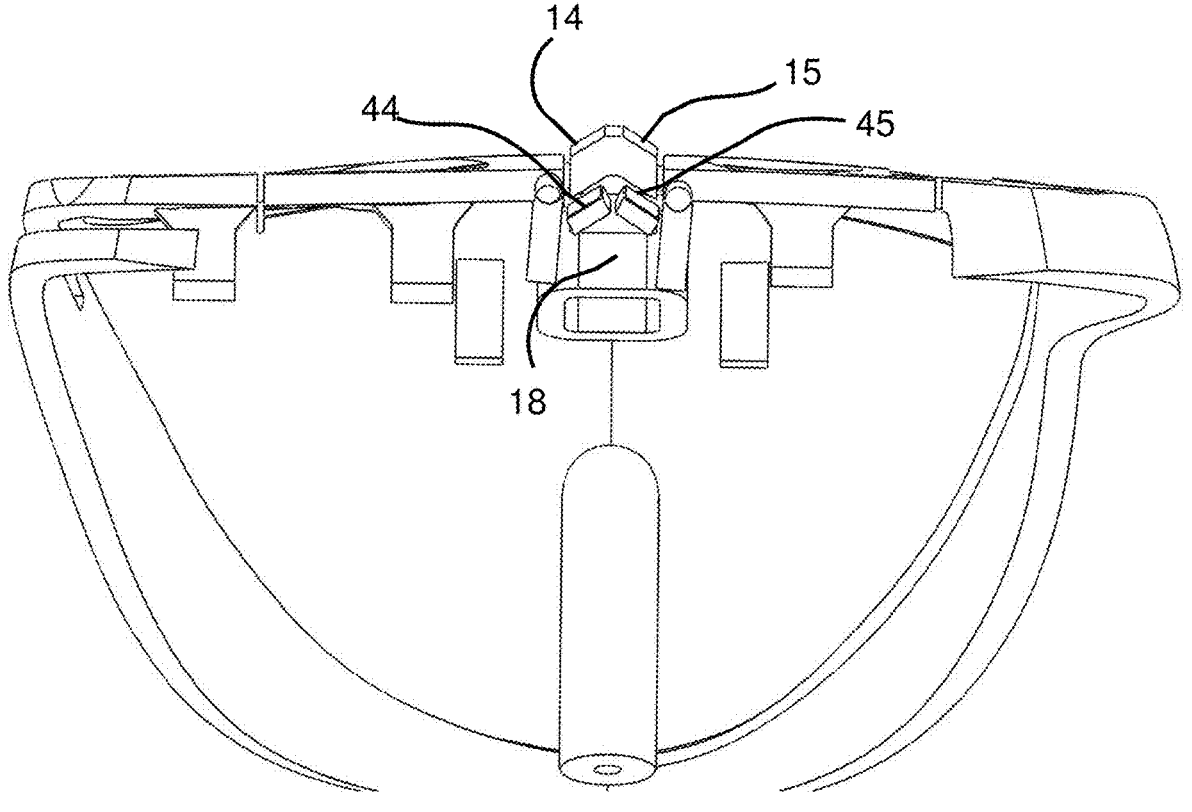
FIG. 3 is a cross sectional view of the underside of the top shell of the preferred embodiment of the present invention.

FIG. 3 is a cross sectional view of the underside of the top shell 13 of the preferred embodiment of the present invention. The capacitive touch sliders 44 and 45 reside underneath the covers 14 and 15.

Figure 4:
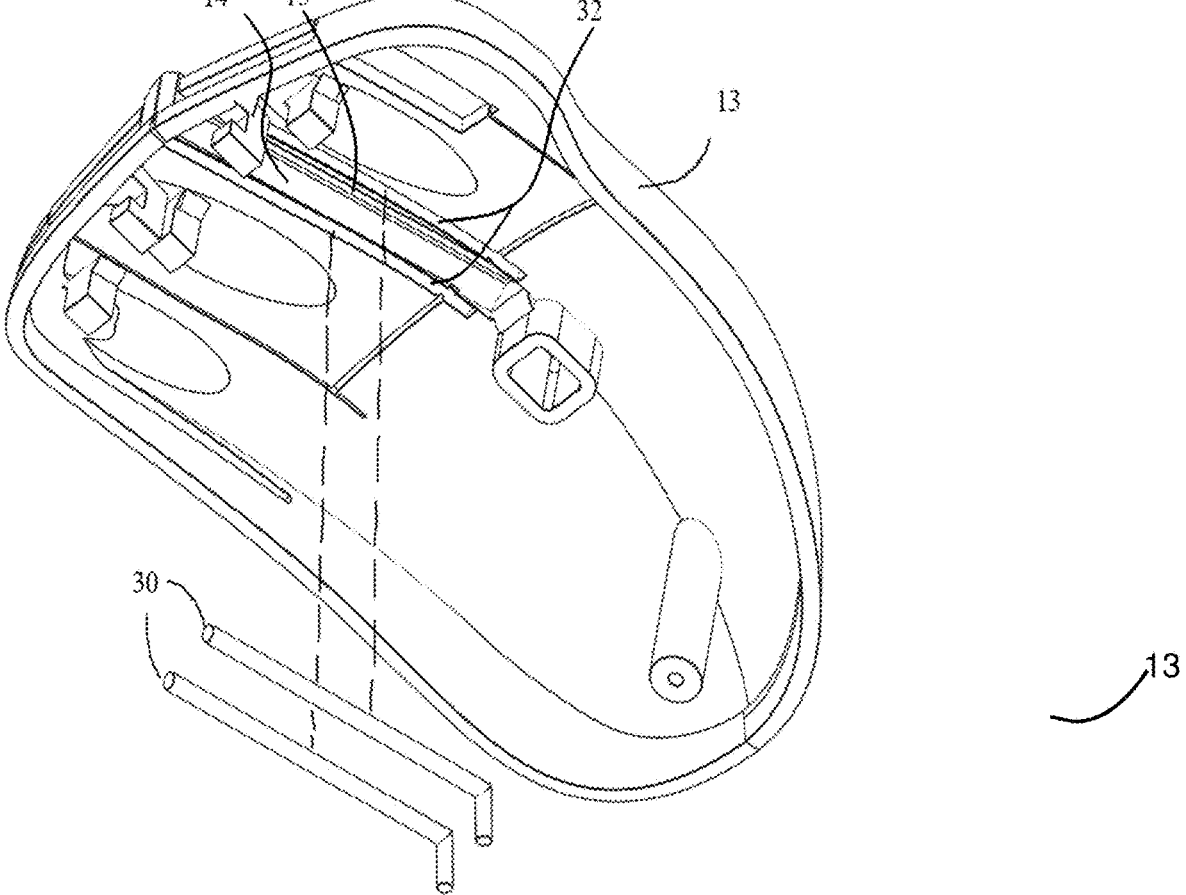
FIG. 4 is a perspective view of the underside of the top shell of the preferred embodiment of the present invention.

FIG. 4 is a perspective internal view of the underside of the top shell 13 of the preferred embodiment of the present invention. The activator wires or rods 30 fit up into the grooves 32 of the underside 13 near the capacitive sliders and will convey the user's actions with the capacitive sliders to the motherboard and ultimately control what is happening on the target display device. Further, when one activator wire is touched first and held by the user, any other activator wire is ignored. Further, when one activator wire is touched first and held by the user, only the programmable strip associated with that activator wire works, and all others are ignored.

Figure 5:
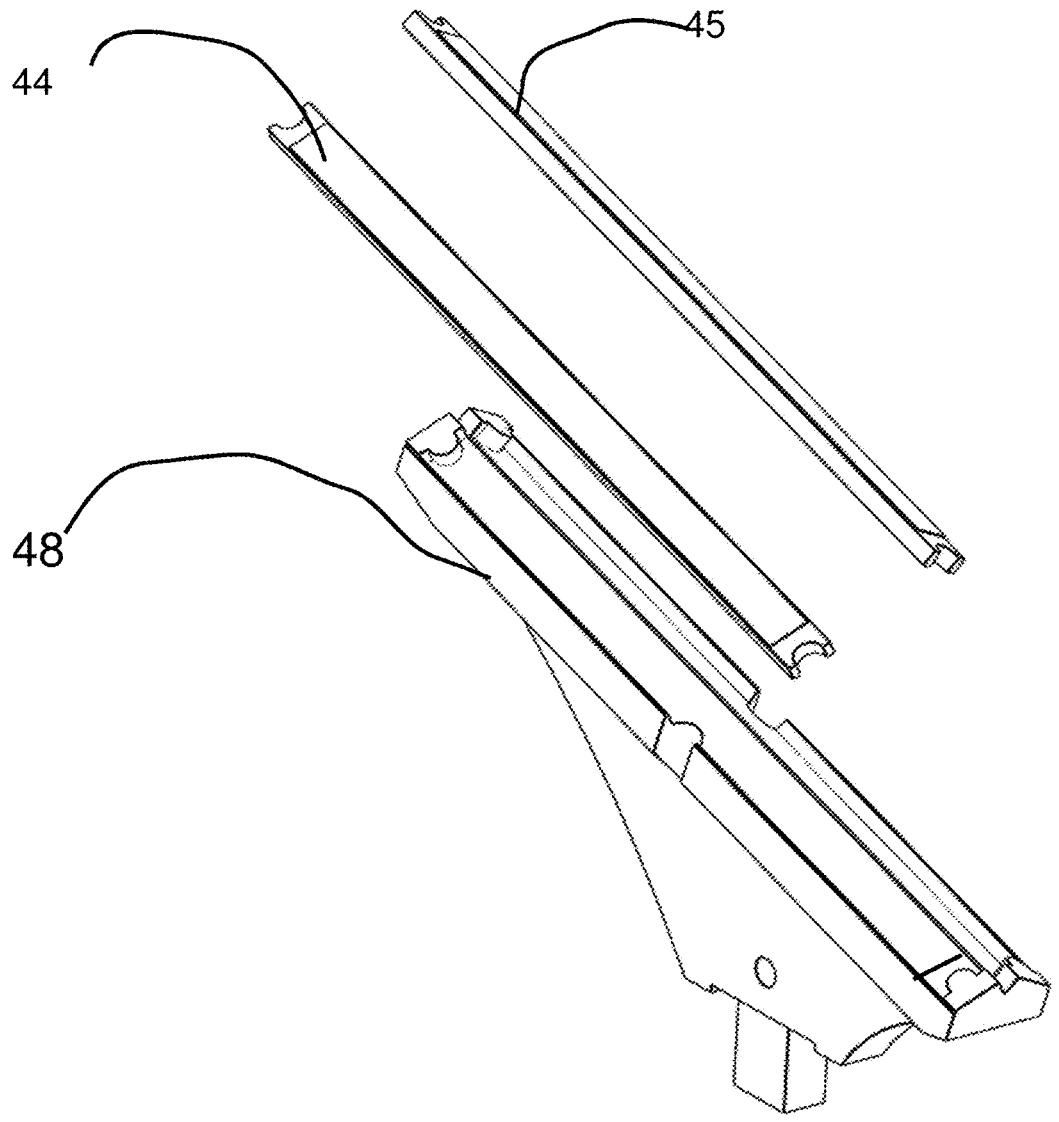
FIG. 5 is an exploded end elevation view showing details of the present invention for some embodiments.

FIG. 5 is a detailed perspective view of key components of some embodiments. The slider covers 14 and 15 are removed. 48 is the support structure for the left and right capacitive touch sliders 44 and 45.

Figure 6:
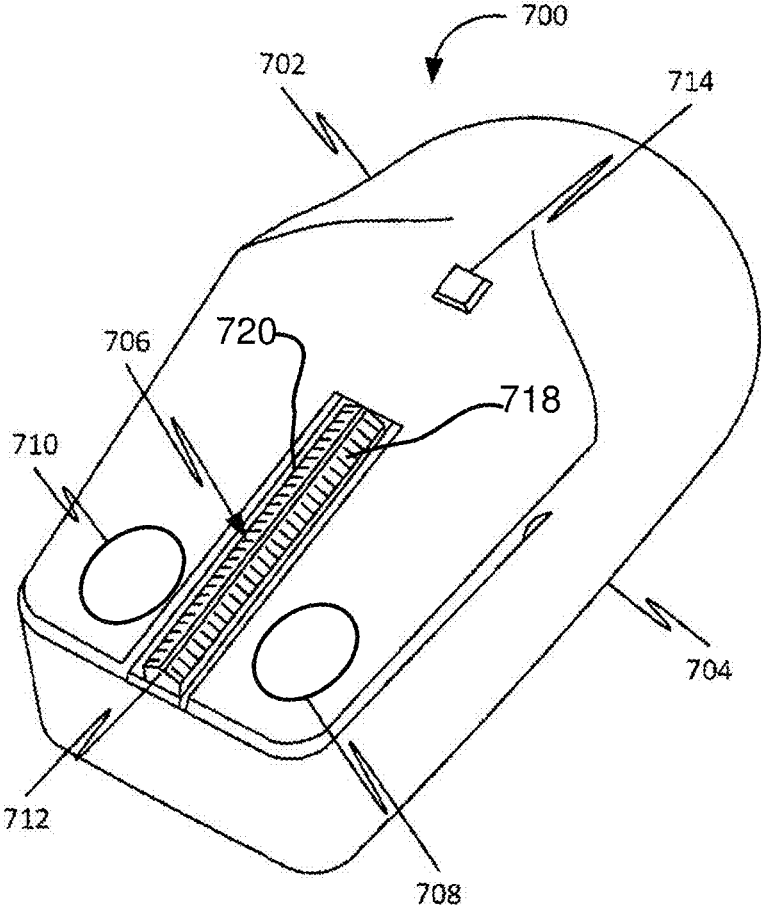
FIG. 6 is a front perspective view of a less preferred embodiment of the present invention.

FIG. 6 is a front perspective view of a less preferred embodiment of the present invention 700. In this embodiment, there is no mouse wheel and there are some other slight differences. For programming, an embodiment is the mouse as the processor. An embodiment is when the mouse is an input device such that it needs to have the driver/software downloaded on the desktop/laptop computers. After downloading the mouse can be programmed to operate under one of the multiple settings (operation modes) of the mouse or the mouse can be left to operate under the default setting of the mouse. The user may even hold the mouse away from a surface to operate the mouse. Further, a pointer finger of the user may rest on a left mouse button 708 of the mouse and a middle finger of the user may rest on a right mouse button 710 of the mouse based on holding the mouse. If the user wants to scroll down, (under an exemplary setting of the mouse), the user slides the pointer finger (finger) to the right until it touches a programmable capacitive slider, 718 or 720, of the slider assembly 706. The scroll will begin at the default setting. The user may hold the pointer finger there to continue the scroll. If the user wants to scroll faster, the user slides the pointer finger in a downward direction on the programmable strip. If the user wants to scroll slower, the user may slide the pointer finger in an upward direction on the programmable capacitive strip from the current position on the programmable strip. If the user wants to stop scrolling, the user may slide the pointer finger back on the left mouse button or lift the pointer finger from the programmable strip. If the user wants to scroll up, (under an exemplary setting of the mouse), the user slides the middle finger (finger) to the left until it touches a programmable strip of the mouse. The scroll will begin at the default setting. The user may hold the middle finger there to continue the scroll. If the user wants to scroll faster, the user slides the middle finger in a downward direction on the programmable strip. If the user wants to scroll slower, the user may slide the middle finger in an upward direction on the programmable strip from the current position on the programmable strip. If the user wants to stop scrolling, the user may slide the middle finger back on the right mouse button or lift the middle finger from the programmable strip. 714 is a center button shaft to press an internal electrical button to perform certain function. 702 is the top shell and 704 is the bottom shell. 708 is the left cantilever button while 710 is the right cantilever button. The button, when pressed, allows performing certain functions.

Figure 7:
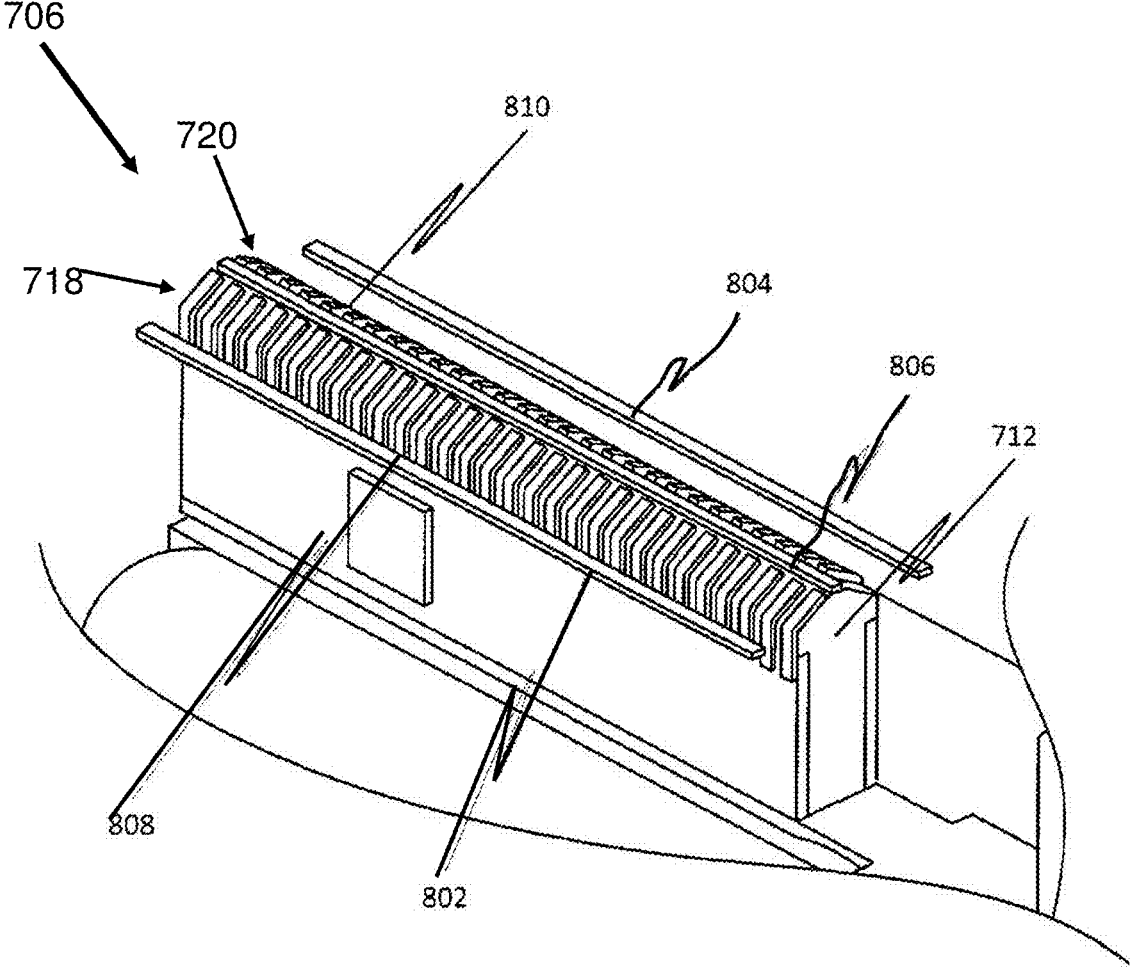
FIG. 7 provides a close-up perspective view of key portions of some embodiments of the current invention without the top shell.

FIG. 7 provides an enlarged perspective view of key portions of the capacitance tough slider assembly 706 with a support structure 712 for holding the left slider assembly 718 and the right slider assembly 720. The two slider assemblies are separated by an elongated insulating strip 806. Each of the capacitance slider assemblies consists of between 20 and 30 parallel bent wire elements 808 on the left and 810 on the right, each of which is a separate capacitive sensor. Adjacent to the left slider assembly 718 is an elongated activation wire 802. Similarly, 804 is an activation wire for the right slider assembly 720. Further, the left activator wire 802 and the right activator wire 804 may be 2 mm wide and positioned 0.03" from the at least one programmable strip 706 of the mouse 700. If an activator wire or strip 802 or 804 of the plurality of activators 802 and 804 is a flat rectangle, the width of the strip is about 2 mm. An optional central elongated strip 806 may be added as an insulator or additional activator.

Figure 8:
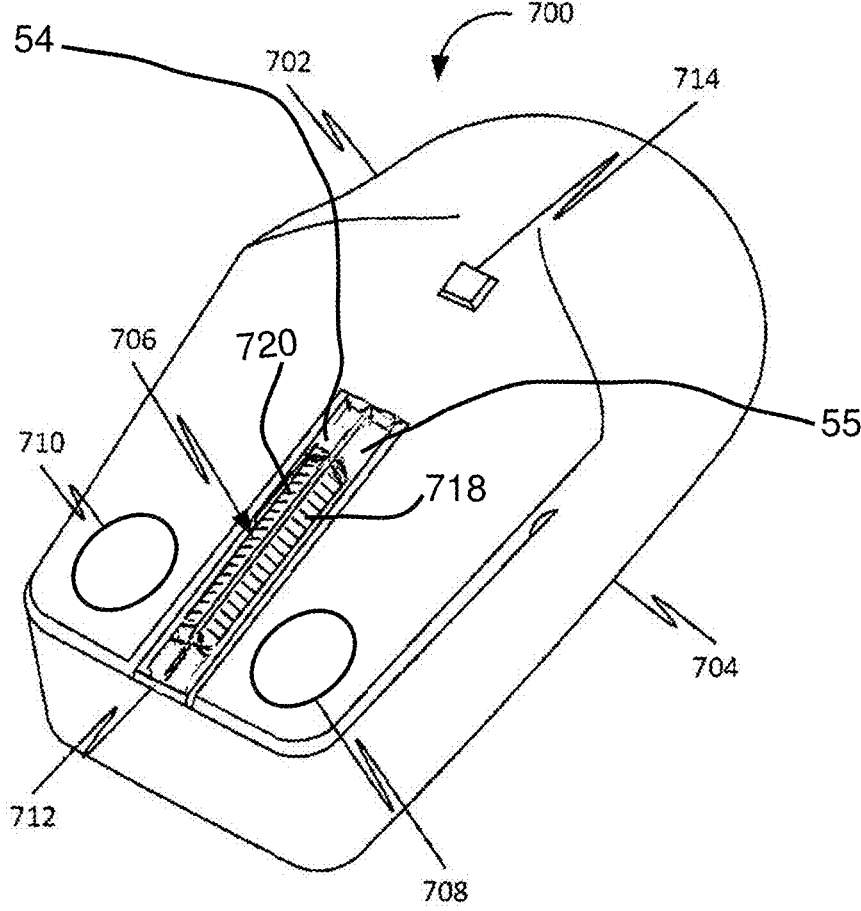
FIG. 8 is a front perspective view of a yet another alternative embodiment of the present invention.

FIG. 8 is a front perspective view of yet another alternative embodiment of the present invention, but very similar to that of FIG. 5. In this configuration, the two capacitive touch sliders 718 and 720 can also actually slide up and down the channels 54 and 55. The capacitive touch sliders still respond to finger touching position as before, but position in the channels 54 and 55 can add another response variable to be employed in the programming without any finger lifting. Or, it can simply allow the user to select a more comfortable position for the capacitive sliders on the mouse.

Figure 9:
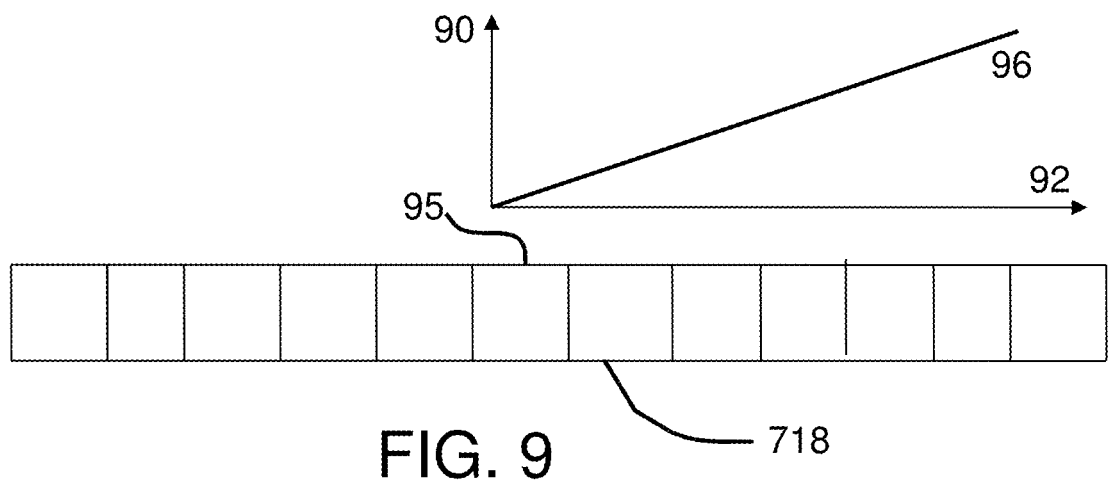
FIG. 9 is a schematic diagram of one aspect of one mode of operation.

FIG. 9 is a schematic diagram of a first aspect of one mode of operation-Mode A. 90 is the speed of scroll/zoom, 92 is the direction of scroll/zoom, and 96 is a linear representation per user setting of the speed increments. 718 is the left capacitive strip. When the user randomly touches the strip 718 location, the scroll/zoom direction and speed defaults per user setting and initiates. Then when the user slides a finger in direction 92, the speed increases linearly. The user can hold position and the speed remains constant in the direction 92. If the user moves his finger slightly in the opposite direction, the speed defaults and the direction reverses to 93—refer to FIG. 10.

Figure 10:
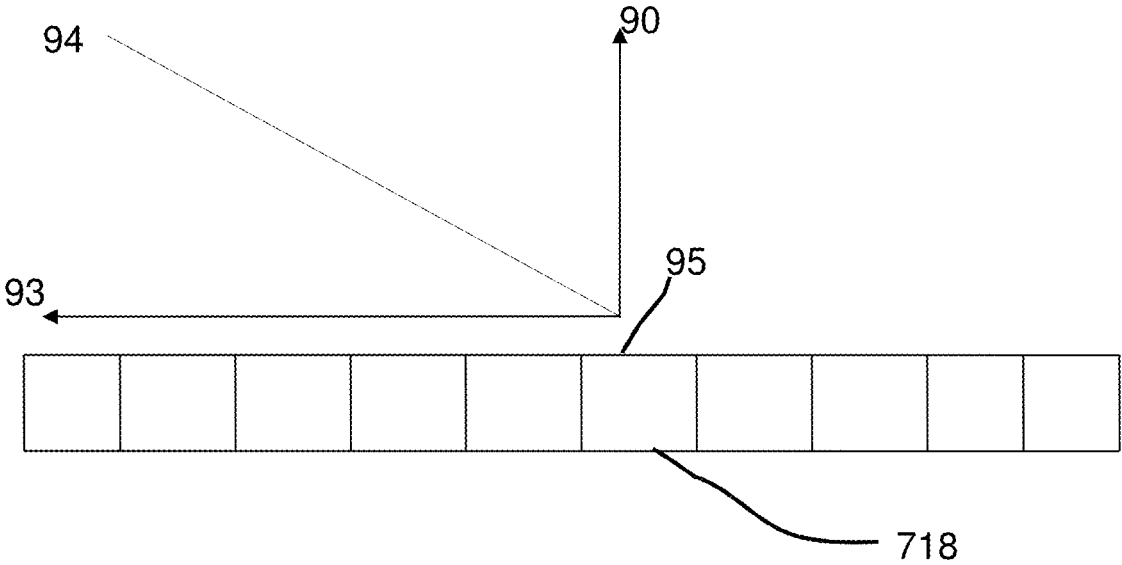
FIG. 10 is a schematic diagram of a second aspect of one mode of operation.

FIG. 10 is a schematic diagram of a second aspect of one mode of operation—also Mode A. 90 is the speed, 93 is the direction, and 94 is the speed linearly increasing. Refer to FIG. 9 then come to FIG. 10 as a continuation of operation. The user moved his finger in the opposite direction of 92, to 93, the speed 90 defaults and the direction becomes 93. The speed increases as the user slides his finger in the direction 93. To stop scroll/zoom, slide finger away from 718 or lift finger.

Figure 11:
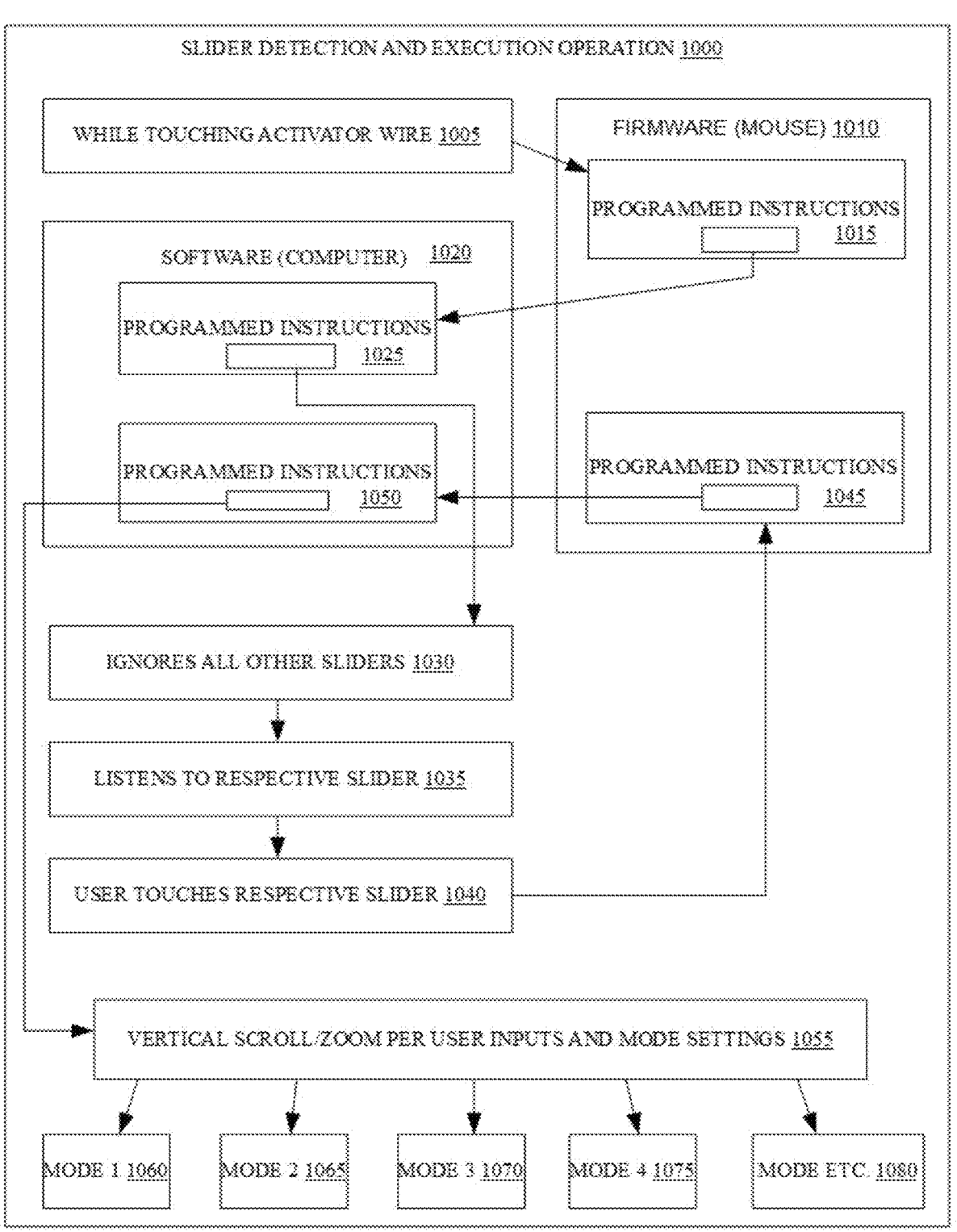
FIG. 11 is a schematic diagram illustrating the interconnections of various elements in the system.

FIG. 11 is a schematic diagram illustrating the interconnections of various elements in the system for slider detection and execution operation 1000. When the user places his finger where he/she wants to begin scrolling, the user slides the finger to the right direction to touch the left slider 718 in this example. The first contact would be the left activation wire 802. While touching activator wire 1005, the firmware 1010 within the motherboard 40 sends data 1015 to the computer software 1020. The software 1020 provides instructions 1025 to ignore all other sliders 1030 and only to listen to its respective slider 1035 which is 718 in this example. The user continues to move his finger to the right and until 718 begins to pick up the finger voltage. The user touches the respective slider 1040 and data is received via firmware 1045. Firmware sends programmed instructions 1045 to the software in the computer 1020 of which sends programmed instructions 1050 to control the scroll/zoom. The vertical scroll/zoom per user inputs and mode setting 1055 is activated. Mode 1 1060, Mode 2 1065, Mode 3 1070, Mode 4 1075 and mode ETC 1080 are possible custom scroll/zoom features that control the way the user scroll/zooms. The user can customize these modes via the GUI on the computer. Each of these modes have a termination of scroll/zoom when the user is not using the slider.

While a presently preferred and alternative embodiments of the present invention have been described in sufficient detail above to enable a person skilled in the relevant art to make and use the same, it should be obvious that various other adaptations and modifications can be envisioned by those persons skilled in such art without departing from either the spirit of the invention or the scope of the appended claims.

I claim:

1. An input device for performing operations on a display of an electronic device, the input device comprising:

a housing having an internal cavity;

two capacitive touch sliders disposed proximal a surface of the housing, the capacitive touch sliders configured to produce a signal in either of two finger movement directions;

wherein the two capacitive touch sliders are movably disposed in elongated channels configured to allow the capacitive touch sliders to move in either of two directions;

at least one programmable button disposed proximal the surface of the housing and configured to produce a signal when depressed; and, a communication interface disposed within the internal cavity, wherein the communication interface is operably coupled to the capacitive touch sliders and the programmable depressible button, and is configured to electronically interface with the display of the electronic device.

* * * * *